Feb. 27, 1968     G. A. CASON, JR     3,370,895
BEARING SEAL FOR DRILLING BITS
Filed Sept. 28, 1965
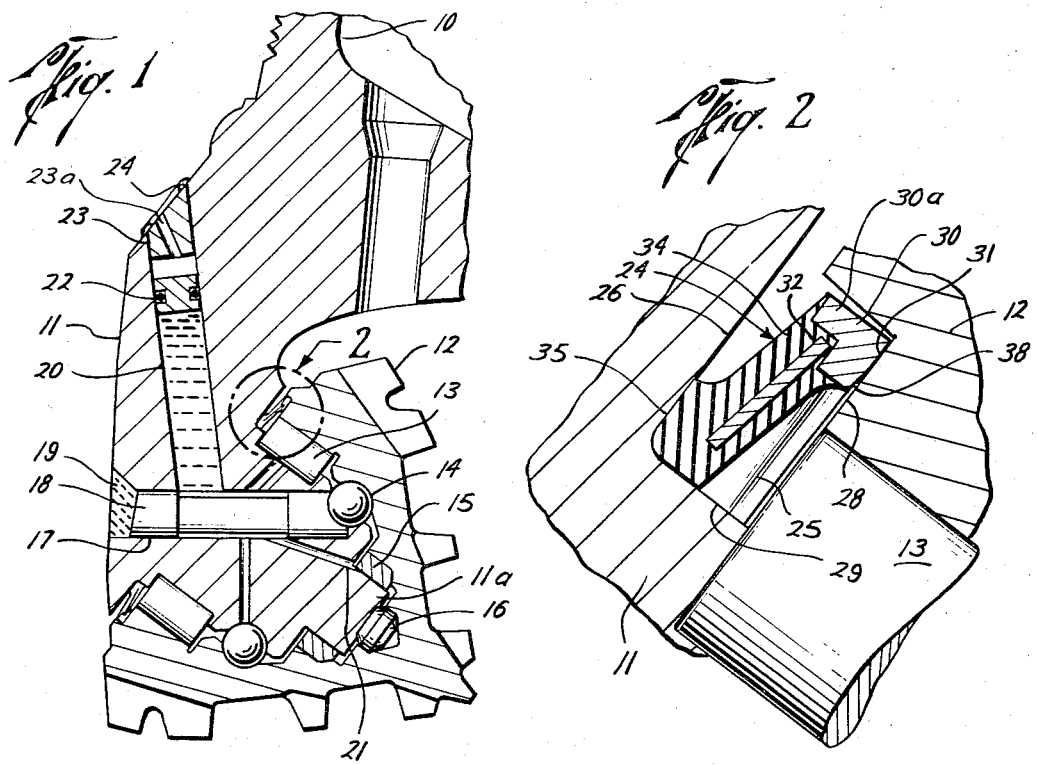
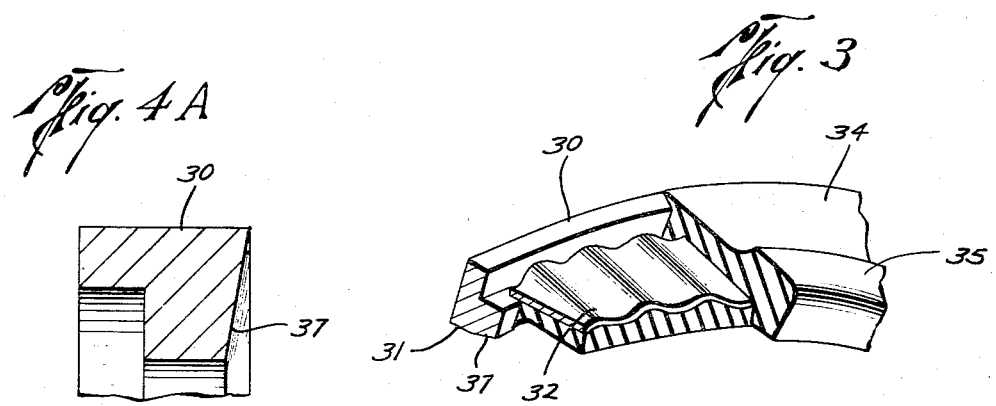
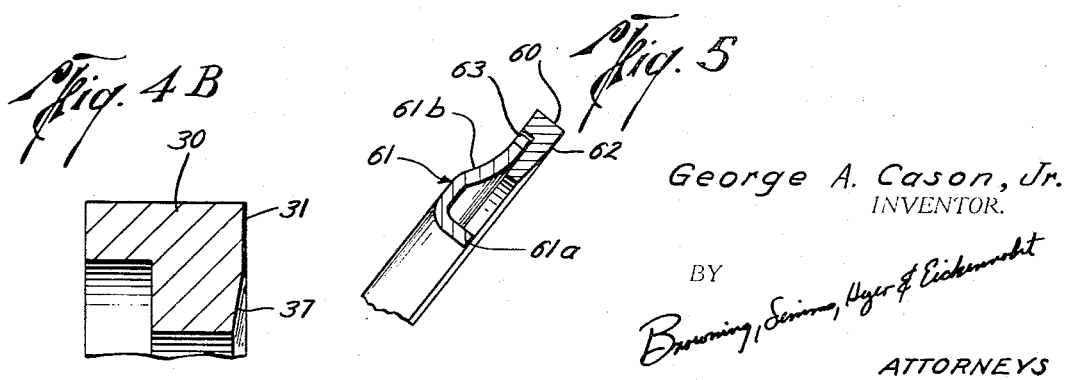
George A. Cason, Jr.
INVENTOR.
ATTORNEYS United States Patent Office 3,370,895
Patented Feb. 27, 1968

3,370,895
BEARING SEAL FOR DRILLING BITS
George A. Cason, Jr., Dallas, Tex., assignor to Dresser Industries, Inc., a corporation of Delaware
Filed Sept. 28, 1965, Ser. No. 490,936
1 Claim. (Cl. 308—8.2)

ABSTRACT OF THE DISCLOSURE

A seal for use in a drilling bit having a rolling cutter rotatably mounted on bearings supported by an arm. The seal includes an annular body of resilient material encircling the arm and in sealing engagement therewith; a ring, preferably constructed from a rigid metallic alloy, bonded to the outer periphery of the body and having a surface thereon in sliding and sealing engagement with the cutter; and, a frusto-conical spring embedded in the body that is arranged to bias the inner peripheral portion of the body into sealing engagement with the arm and to bias the ring into sealing engagement with the cutter.

---

This invention relates to seals for holding the lubricant in and the ambient fluid, which may be liquid, air, or gas and entrained materials, out of the bearings that rotatably support the cutters of a rolling cutter type of earth drilling bit.

Since the advent of the rolling cutter type of drilling bits, a continuing effort has been made to increase the life of the bearings used to rotatably support the cutter. Many efforts have been made in the past to provide a seal that would keep a lubricant in the bearings and the drilling fluid out to thereby increase the life of the bearings. Indeed, efforts to accomplish this probably began with the first rolling cutter type bits; certainly it was not long thereafter. Heretofore, no completely satisfactory seal has been provided for this purpose, i.e., one that will last long enough to hold a lubricant in the bearings for the life of the bit. There are several reasons why it is difficult to provide a satisfactory seal for this purpose. For example, space for the seal is limited. The cutter not only rotates on the bearings, but it also wobbles and moves axially. Also the environment for the seal is abrasive and hot.

It is an object of this invention to provide an improved seal that will keep the lubricant in and the ambient fluid out of the bearing or bearings that rotatably support a cutter on a rolling cutter type of drill bit for the life of the bit. The seal of this invention can be used, of course, in devices, other than drill bits, that have similar design criteria for their bearing seals.

It is another object of this invention to provide an improved seal for keeping drilling fluid out of the bearings of a rolling cutter type of drill bit that is highly resistant to wear by the relative motion between the seal and the member against which it is in sliding sealing engagement, thereby greatly increasing the useful life of the seal.

As stated above, the rolling cutters of a drill bit usually rock or wobble on their support bearing to some extent even when new. As the bearings wear, this wobbling increases. Therefore, it is another object of this invention to provide a lubricant seal for a rolling cutter of a drill bit, that is sufficiently flexible to hold a rigid, hard, brittle ring of wear resistant material in sliding, sealing engagement with the cutter without damage to the ring, even though the cutter moves axially, radially, and wobbles on the arm.

These and other objects, advantages, and features of the invention will be apparent to those skilled in the art from a consideration of this specification and attached drawings.

In the drawings:

FIGURE 1 illustrates the preferred embodiment of the invention in the environment of a vertical sectional view through a portion of a rolling cutter type of drill bit showing one depending arm with a rolling cutter mounted thereon;

FIGURE 2 is a view on an enlarged scale of the encircled portion of FIGURE 1;

FIGURE 3 is a sectional view of the seal shown in FIGURE 2 with a portion of the body of elastomeric material broken away;

FIGURE 4A is a sectional view through the ring or washer of hard, abrasive resistant material that is employed in the preferred embodiment of the invention to provide the abrasive resistant surface for slidingly and sealingly engaging the cutter, the ring being shown, before the sealing surface has been ground thereon;

FIGURE 4B shows the washer or ring of FIGURE 4A after it has been ground to provide it with a flat sealing surface;

FIGURE 5 is a vertical sectional view through an alternate embodiment of the seal of this invention.

Referring to FIGURES 1 and 2, the bit includes a body 10 having a depending arm 11. Cutter 12 is contoured internally and the end of arm 11 is contoured externally to provide race ways for bearings to rotatably support the cutter on the arm. Roller bearing 13 assumes radial loads and ball bearing 14 assumes both radial and axial loads on the cutter. Inner end 11a of arm 11 is of reduced diameter to form a pilot pin that fits within bushing 15. The bushing provides a journal bearing to also assume some of the radial loads imposed on the cutter. In addition, thrust button 16 is located between the end of arm 11 and the cutter to provide an additional thrust bearing to assist ball bearing 14 in assuming the axial loads imposed on the arm by the cutter.

Bore 17 extends through the arm and provides a passageway through which the balls that make up ball bearing 14 can be inserted into position after the cutter is in place on the arm. The balls lock the cutter on the arm. After the balls are in place, plug 18 is inserted in bore 17 and welded therein by weld 19. Plug 18 is formed on its inner end to complete the race on the arm for ball bearing 14.

Arm 11 is also provided with a passageway 20 through which the annular area between the cutter and the arm in which the bearings are located can be filled with lubricant after the cutter is assembled on the arm. Passageway 20 intersects bore 17 and plug 18 is of reduced diameter as shown to allow the lubricant to flow from bore 17 to the bearings through openings 21.

After the bearing area and the passageways, except the upper end of passageway 20, are filled with lubricant, piston 22 is located in passageway 20 and its upper end is closed by cap 23. The cap is held in place by spot welds 24 and provided with vent hole 23a to thereby expose the upper side of piston 22 to the ambient pressure. In this manner, with seal 24, which will be described in detail below, in position sealingly engaging both arm 11 and cutter 12, the lubricant will be maintained in the bearing area and the passageways at the same pressure as that of the environment of the bit.

Referring now to FIGURE 2, arm 11 and cutter 12 are provided with radially extending, generally parallel, flat surfaces 26 and 28 respectively. These surfaces combine with outer surface 29 of shaft 11 to provide an annular space in which seal 24 is located. The seal includes an annular washer or ring 30 having a flat smooth face 31 in sealing, sliding engagement with surface 28 of the cutter. Resiliently holding ring 30 in engagement with the cutter is spring 32. The spring is made of resilient material, such as spring steel, corrugated as shown in FIG- URE 3. It is frusto-conically shaped to exert a resilient force when axially flattened. The ring is L-shaped in cross section to provide a laterally extending annular flange 30a that encircles the outer end of the spring and holds the ring against lateral movement relative to the spring.

Means are provided to seal between the spring and the ring and to provide a flexible connection therebetween to hold the spring and the ring against relative rotation. In the embodiment shown, annular body 34 of elastomeric material, such as rubber, is bonded to both ring 30 and spring 32. The body extends radially inwardly to engage arm 11. It is also provided with a flat sealing face 35 to sealingly engage surface 26 of arm 11.

Body 34 and spring 32 are frusto-conically shaped, having an axial length, when relaxed, that is greater than the distance between surfaces 26 and 28. Thus, when the seal is installed in annular space 25, it is axially flattened, causing spring 32 to exert a resilient force on ring 30, urging its face 31 against surface 28 of the cutter. The spring also exerts the same resilient force on body 34 urging its sealing face into sealing engagement with surface 26 of the arm. Preferably, body 34 does not rotate relative to arm 11 so that wear is restricted to the wear ring 30 in use. To insure that relative rotation does not occur between the seal and the arm, body 34 may be made small enough to prevent rotation due to interference when mounted on the arm or attached to the inner surface of the arm, either by bonding the rubber to the arm or by using a suitable adhesive such as epoxy resin cement, or may be of a configuration providing a non-circular and hence non-rotatable fit with the arm.

With the arrangement just described, the seal can be provided with a washer or ring made of most any material that has good wear characteristics and non-galling compatability with the material of the cutter. The material that is preferred is a hard, wear resistant material, such as Stellite. Such material as Stellite can be used even though it is very brittle because a flexible connection is provided between the spring and the ring by the elastic body which accommodates any axial, radial or wobble movement of the cutter on the arm. When a hard material, such as Stellite, is employed for the ring, the sealing surface thereof, which in this embodiment is surface 31, should be ground as smooth as possible, as should surface 28 on cutter 12. Then both of these surfaces should be lapped together. Usually, cutter 12 is made of steel that is heat treated to provide a surface hardness somewhere in the neighborhood of 58 Rockwell C. Thus, surface 28 will grind and lap to a very smooth flat surface for sealingly engaging surface 31 on ring 30.

Materials such as the fluorocarbons and some of the plastics with wear resisting lubricating qualities also may be used for ring 30.

If it is desired to make ring 30 of a relatively soft material, such as Teflon, then the lapping operation is not required. Preferably, surface 28 is ground as smooth as possible, however. When a soft material is used for the ring, it is believed that abrasive materials probably enter between the ring and the sealing surface on the cone, but that due to the softness of the material from which the seal ring is made, these abrasive materials are forced into the seal ring and do not cause any damage to the sealing surface of the cone.

When ring 30 is made of a hard material, such as Stellite, preferably it is shaped as shown in FIGURE 4A and 4B. In FIGURE 4A, the ring is shown in cross section as it is initially formed. It is L-shaped and has a radially inwardly tapering surface 37. In FIGURE 4B, surface 37 has been ground to provide radially extending flat surface 31; however, the inner portion of surface 37 has been left to provide a trap or pocket 38, as shown in FIGURE 2, between the ring and surface 28 of the cutter in which lubricant can be held adjacent the two engaging surfaces. By the rotating action of the cutter and by its wobbling action on its bearings, the lubricant in this pocket is fed to the two engaging surfaces and lubricates them as the cutter rotates.

FIGURE 5 shows an alternate embodiment of the invention. It includes a washer or ring 60, which is shaped in the same manner as ring 30 in the embodiment described above. It also can be made from a wide variety of materials. Spring 61 is provided to hold the ring in sealing engagement with the cutter. The spring includes a cylindrical section 61a and a spring section 61b. The cylindrical section is designed for a force fit on shaft 11 thereby providing a seal between the spring and the shaft. The force fit also prevents relative rotation between the members. Spring 61b is frusto-conically shaped, so as to be axially flattened when the seal is installed between the cutter and the arm in the manner that seal 24 is axially flattened when installed as shown in FIGURE 2. When installed, the upper end of the spring section of the spring will be forced into sealing engagement with the ring to provide a seal therebetween and also to hold the ring in sliding sealing engagement with the cutter.

Also, means are provided to hold the ring against movement relative to the spring. In the embodiment shown, ring 60 is provided with radially extending grooves on the side opposite sealing surface 62. Projections 63 on the upper end of the spring section extend into these grooves to interlock the two members and hold them against relative movement.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a drilling bit having a rolling cutter rotatably mounted on bearings supported by a shaft, a lubricant for the bearings, a radial surface on the shaft spaced from and facing and generally parallel to a radial surface on the cutter member, the improvement comprising an annular seal encircling the shaft and located in the space between the radial surfaces, said seal including:

an annular body of resilient material having
    an annular seal portion sealing engaging the shaft, and
    a frusto-conical web portion extending angularly from said seal portion relatively toward the radial surface on said cutter member, said radial surface of said cutter being a ground hardened steel surface;
a ring bonded to the outer periphery of said web portion, said ring being constructed from a hard, brittle, abrasion resistant metallic alloy of non-galling compatibility with the cutter, said ring having
    a flat surface sealingly and slidingly engaging the radial surface on said cutter,
    a surface portion adjacent the inner periphery of said ring disposed angularly with respect to the radial surface on said cutter, said surface portion forming an annular wedge-shaped space having a relatively small apex angle with the radial surface on the cutter for receiving a portion of the lubricant, and
    an axial flange on the outer periphery thereof extending generally toward the radial surface on the shaft; and,
an axially flattenable frusto-conical annular spring embedded in said annular body, said spring having an outer periphery located adjacent and within said flange, said spring resiliently biasing said seal portion toward the radial surface on said shaft and resiliently holding the flat surface on said ring in sliding and sealing engagement with the radial surface on the cutter.

References Cited

UNITED STATES PATENTS

| | | | |
|---|---|---|---|
| 2,189,197 | 2/1940 | Cerny | 208—187.1 |
| 2,267,994 | 12/1941 | Reynolds | 308—187.1 |
| 2,608,425 | 8/1952 | Krug | 277—95 X |
| 2,701,154 | 2/1955 | Dolhun | 308—187.1 |
| 2,776,851 | 1/1957 | Heinrich | 308—187.1 |
| 2,853,223 | 9/1958 | Engelking | 277—96 |
| 2,858,149 | 10/1958 | Laser | 277—88 |
| 2,910,313 | 10/1959 | Bour | 308—187.1 |
| 2,916,313 | 12/1959 | Ziller | 308—187.1 |
| 3,086,782 | 4/1963 | Peickii | 277—96 |
| 3,096,835 | 7/1963 | Neilson | 308—8.2 |
| 3,137,508 | 6/1964 | Cunningham | 308—8.2 |
| 3,199,795 | 8/1965 | Bennett | 277—96 |
| 3,199,878 | 8/1965 | Cunningham | 308—8.2 |
| 3,216,513 | 11/1965 | Robbins | 308—8.2 |
| 3,269,738 | 8/1966 | Baumler | 277—88 X |

FOREIGN PATENTS

| | | |
|---|---|---|
| 528,972 | 6/1954 | Belgium. |
| 727,135 | 3/1955 | Great Britain. |

MARTIN P. SCHWADRON, *Primary Examiner.*

L. L. JOHNSON, *Assistant Examiner.*